United States Patent [19]

Jones et al.

[11] Patent Number: 5,048,921
[45] Date of Patent: Sep. 17, 1991

[54] OPTICAL FIBRE CABLE JOINT

[75] Inventors: Richard K. Jones, Stortford; Paul M. Ryan, Chelmsford, both of Great Britain

[73] Assignee: STC PLC, London, England

[21] Appl. No.: 551,146

[22] Filed: Jul. 11, 1990

[30] Foreign Application Priority Data

Jul. 14, 1989 [GB] United Kingdom ............... 8916132

[51] Int. Cl.⁵ .................... G02B 6/44; G02B 6/36
[52] U.S. Cl. ........................... 385/69; 385/87
[58] Field of Search ............... 350/96.2, 96.21, 96.23

[56] References Cited

U.S. PATENT DOCUMENTS

| 4,516,830 | 5/1985 | Guazzo | 350/96.2 X |
| 4,545,645 | 10/1985 | Mignien | 350/96.21 |
| 4,595,256 | 6/1986 | Guazzo | 350/96.21 |
| 4,645,296 | 2/1987 | Cattin et al. | 350/96.21 |
| 4,730,890 | 3/1988 | Kashimura et al. | 350/96.2 |
| 4,753,500 | 6/1988 | Guazzo | 350/96.2 |
| 4,815,810 | 3/1989 | Betzler et al. | 350/96.2 |
| 4,846,545 | 7/1989 | Estabrook et al. | 350/96.21 |

FOREIGN PATENT DOCUMENTS

| 0067673 | 12/1982 | European Pat. Off. . |
| 1510017 | 5/1978 | United Kingdom . |
| 2025650 | 1/1980 | United Kingdom . |
| 1563061 | 3/1980 | United Kingdom . |
| 2030723 | 4/1980 | United Kingdom . |

Primary Examiner—John D. Lee
Assistant Examiner—John Ngo
Attorney, Agent, or Firm—Lee, Mann, Smith, McWilliams & Sweeney

[57] ABSTRACT

A joint for an optical cable has a tapered hollow insert (26) with high friction surfaces (26D) so that after jointing the optical package, the cable strength members (6A 6B) can be clamped onto the high friction surfaces of the insert by a wedging action. The surfaces prevent strength members moving axially and imposing longitudinal strain on the jointed package, and the arrangement is such that the differential strain between the strength member layers are minimized if not eliminated.

8 Claims, 2 Drawing Sheets

OPTICAL FIBRE CABLE JOINT

This invention relates to an optical fibre cable joint, particularly one which is small both in diameter and axial length.

There have been a number of previous proposals for jointing optical fibre cables, particularly cables for underwater use where high tensile strength is one of the prime requirements. Examples of prior proposals are shown in U.S. Pat. No. 4,595,256 and UK Patent No. 2030723.

U.S. Pat. No. 4,595,256 is large in the radial direction. When the joint is large, extra strain is exerted on the points of the cable where they emerge from the joint, particularly when the jointed cable undergoes winding on a drum or running over a sheave.

Our published British Patent Application No. 2199961A discloses an optical fibre cable having an optical fibre package surrounded by a wire strength member layer, and this is similar to the particular cable with which the joint of the invention is to be used (although it can be used for other cables with a central fibre package and a surrounding tensile layer). This cable has an ultimate tensile strength of over 60 kN and a load verses strain characteristic of not more than 1% strain at just over 50 kN load. Such strength is required also of the joint in use of the joint with this cable.

It is an object of the present invention to provide a compact joint for this cable and other cables of similar basic construction.

According to the present invention there is provided a joint for jointing opposed ends of an optical fibre cable having a circular strength member, the joint comprising a first part for accommodating joined optical fibres of the opposed ends and having an outer taper at each end and, for each said end, an associated second part having an inner taper which matches the associated outer taper, wherein the first and second parts can be forced axially together to clamp opposed end portions of the strength member between respective ends of the first part and each associated second part, and means for retaining the second parts in position to retain said end portions clamped in the joint.

According to another aspect of the present invention a method of jointing an optical fibre cable having an optical fibre package and a surrounding wire strength member, comprising jointing the optical fibre packages, jointing the strength members onto a rigid common hollow part surrounding the package joint by applying a clamp member over respective ends of the hollow part to clamp the strength members to the hollow part and applying a tensile load bearing member to the jointed strength members, the load bearing member being able to sustain the tensile load applied to the jointed cable in use thereof.

According to a further aspect of the present invention there is provided a joint for an optical fibre cable having a central optical fibre package and a pair of surrounding wire strength member layers, the joint comprising a hollow part having an outer taper at each end and for each end a clamp member having an inner taper for clamping the outer strength member layer of the cable and a sleeve-like tapered wedge for location between the layers whereby the inner layer can be wedged between the tapered wedge and the outer taper and the outer layer can be wedged between the inner taper and the tapered wedge by the application of a preloading force across the clamp members forcing them towards each other, any differential strain between the layers as a result of the preloading force being minimised if not eliminated.

According to yet another aspect of the present invention there is provided a method of jointing an optical fibre cable having an optical fibre package and a surrounding wire strength member, the method comprising joining the optical fibre package, providing a rigid hollow part over the joined package and having an outer taper at each end, and providing a pair of clamp members having respective inner tapers, the method further comprising clamping the strength members of the cable onto respective tapers of the first hollow part by a wedging action between the tapers, and securing both clamp members so they cannot move apart.

In order that the invention can be clearly understood reference will now be made to the accompanying drawings in which.

Figure 1:
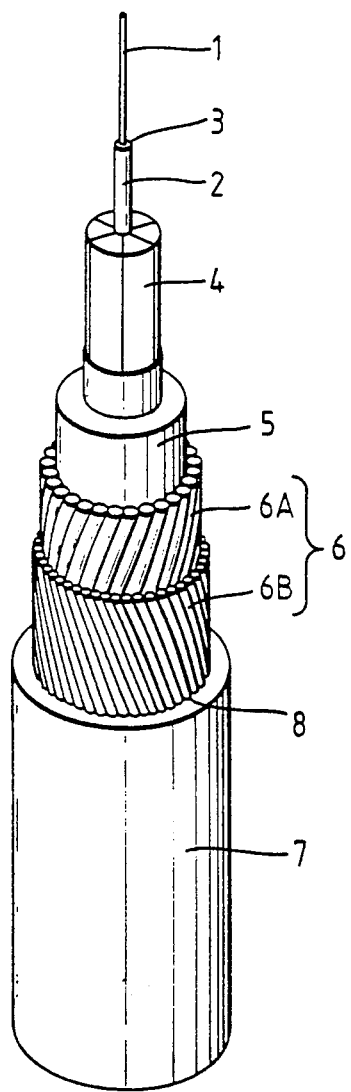
FIG. 1 shows a perspective view of one end of the cable joined by the joint of FIG. 2.

Referring firstly to FIG. 1 of the drawings, the optical fibre cable shown comprises an acrylate coated single mode fibre 1 housed within a steel alloy tube 2, there being a water blocking compound 3 in the gap between the fibre and the tube. Although only one fibre is shown it is possible to have more than one fibre.

Around the tube are a plurality of metal wires 4 e.g. of copper, which have been drawn down to a substantially sector-shaped cross-section so that they each fit together and form a crush-resistant electrically conductive tube around the tube 2.

Around the wires 4 is a semi-conductive layer 5A and around that is an insulating layer 5 to provide electrical insulation between the wires 4 and the tensile strength member 6.

The tensile strength member 6 comprises two contrawound layers 6A and 6B of high tensile steel wires and around the outside of the outer layer 6B is a plastics sheath 7. A water blocking compound 8 fills the interstices of the strength member 6.

Figure 3:
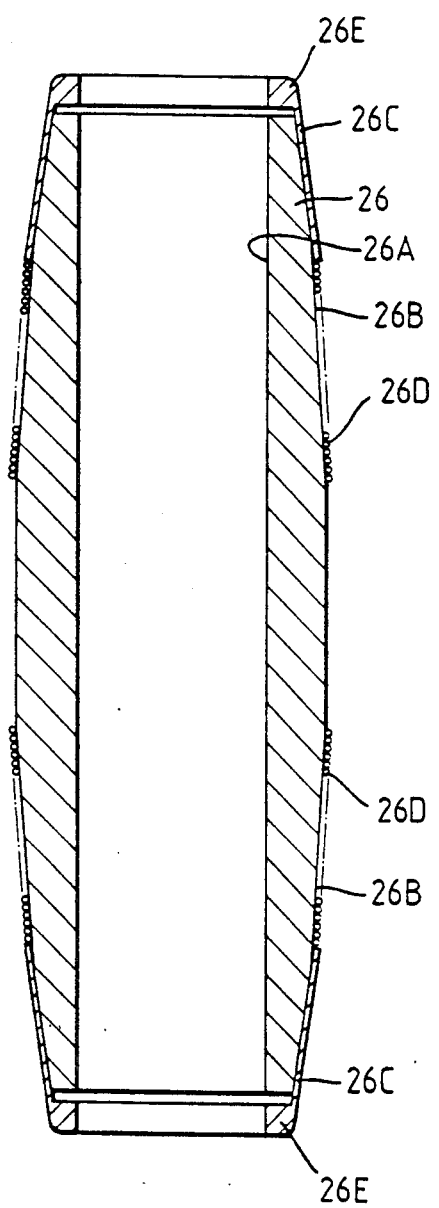
FIG. 3 shows on a larger scale an axial cross-section of the tapered tubular insert of FIG. 2.
Figure 2:
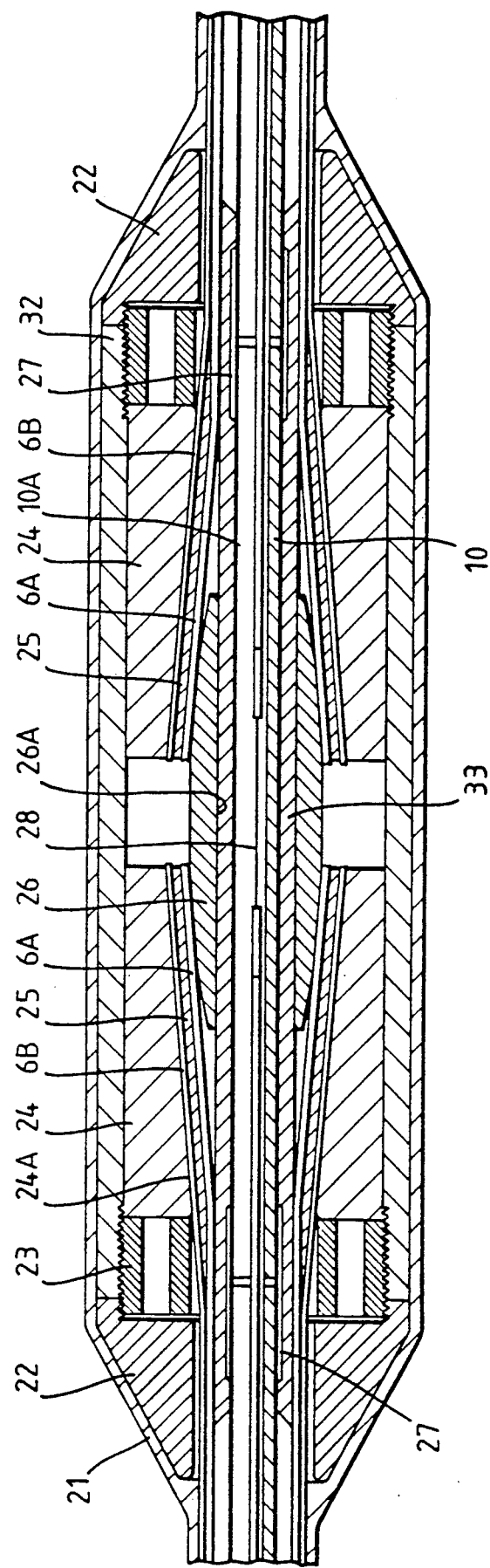
FIG. 2 is an axial cross-section of a joint for jointing an optical fibre cable as shown in FIG. 1 and in accordance with an embodiment of the present invention.

In order to joint two ends of a cable such as shown in FIG. 1, the joint of FIGS. 2 and 3 is proposed. Referring to these drawings the joint comprises a hollow integral one-piece metal rigid insert 26 having a cylindrical bore 26A and outward conical tapers 26B towards opposite ends. At the very ends of this insert the outer surface is more tapered as shown at 26C in FIG. 3 of the drawings. On each tapered portion 26B is a carbide grit coating 26D similar to that discussed in our Pending Patent Application 8826313.2 (C. J. Brown 1). Also each end has a soft-metal nose cone 26E to provide stress relief where the wires 6A leave the insert 26.

As shown in FIG. 2 the tensile strength layer 6A lies against the carbide coated portion of the taper 26B of the tubular insert 26 and also lie on soft metal nose covers 26E shown in FIG. 3, made of mild steel which is softer than the high tensile steel wires 6A. Intermediate conically tapered sleeve-like inserts 25 form wedges which lie in between the two tensile strength layers 6A and 6B. The layer 6B lies on the outside of the intermediate insert 25 and a clamping collar 24 having an internal conical taper 24A is forced longitudinally in order to clamp the tensile strength layers between the insert 26, the insert 25 and the collar 24.

By virtue of the high friction carbide grit coatings 26D on the tubular insert 26, as the collars 24 are forced towards one another (preloaded) in a hydraulic press (not shown) the collars 24 move axially towards each other to clamp the wires by the wedging action of the tapers yet the inner tensile strength members 6A do not move longitudinally in relation to the optical fibre package. This prevents longitudinal compressive forces building up on the optical fibre package during the assembly of the joint. Thus no "differential strain" is locked into the cable as a result of the preloading, and therefore the strand wires can fulfil the tensile requirements as displayed. Differential strain results in a loss of tensile performance of the joint, and the minimisation of this factor is an important feature.

The cable is prepared and the joint is assembled as follows.

In the preparation of the cable ends for jointing, firstly for each end rubber boot and outer protective jacket 21, followed by a profiled end cap 22 are parked down the cable followed by a retaining nut 23. Then for one end only an outer casing 32 is parked. The rubber boots are not shown in the drawing.

Then for each end a collar 24 is parked after the outer sheath 7 has been stripped back exposing the outer strength layer 6B which are then unwound and laid back to the collar 24, exposing the inner tensile strength layer wires 6A.

A sleeve like intermediate insert or wedge 25 is then slid on and parked, and the inner wires 6A laid back to the insert 25.

Following this, on one side only, the tapered insert 26 is slid over the polyethylene insulation 5. This insulation is then stripped back to expose the semi-conductive layer 5A, which is stripped off to expose the copper strands 4 on both ends. Heat shrink tubing is parked on the insulation 5 for both ends to reinstate the semi-conductive layers. Over the strands 4 is slid a metal ferrule 27 for each end. The copper strands 4 are then stripped back to expose the metal tube 2 which is then broken to expose the fibre 1.

Thus the preparation of both ends is very similar except that the insert 26 is parked on one end only as it is common to both ends in the finished joint.

In addition the wires 6A and 6B are cut at a position close to the expected fibre splice so that their opposed ends are closely facing each other as seen in FIG. 2, when the joint is assembled.

Figure 4:
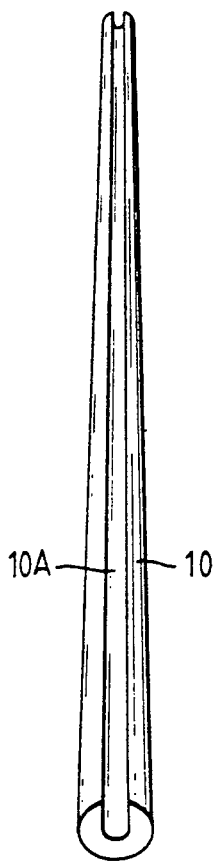
FIG. 4 is a perspective view of part of FIG. 2.

There is also a polyethylene moulding 33 which is used to reinstate the electric insulation and there is a reinstatement tubular member 10 which has a longitudinal slot 10A, for reinstating the copper wires 4 which have been cut back. This is shown clearly in FIG. 4.

The cable ends are then ready for jointing. First the fibres are spliced together at 28 and encapsulated with a thin plastics coating. Then the longitudinally slotted reinstatement tubular member 10 (the slot 10A is visible in FIG. 2 and is in the plane of the Figure) is fitted over the spliced fibre and the exposed metal tube 2 and reinstates those copper wires 4 which have been cut away. As strong adhesive is used in the slot to secure the steel alloy tubes 2. Then the metal ferrules 27 are slid partly over the member 10 (both 27 and 10 are made of beryllium copper in this embodiment) and left partly over the respective ends of the copper wires 4 and flooded with solder. At this point the cable ends are firmly fixed together by means of the member 10 and ferrules 27.

Then a heat-shrink tube previously parked on one side is slid over the region between the ends of the insulation 8 and shrunk down to reinstate the semi-conductive layers 5A. This region is then overmoulded with polyethylene to reinstate the insulating layer.

Following this the tapered insert 26 is slid into position and the inner wires 6A are relaid onto the insert 26 so that they extend just beyond the carbide coatings 26D. As shown in FIG. 3 there are also nose cones 26E which are of softer metal e.g. mild steel than the insert and minimise stress degradation of the wires.

The intermediate inserts 25 are then fitted over the wires 6A, the outer wires 6B are restranded, and the collars 24 fitted over to hold the outer wires in place.

The assembly is then put in a pressing tool which presses axially the collars 24 towards each other, applying a predetermined actuating load. This securely grips the strand wires 6A, 6B, without moving the strand wires 6A relative axially to the ferrule 26 and the optical package because the high friction of the rough surface provided by the carbide coating causes much greater friction on the wires than does the surface of the collar, which thus slides relatively easily to effect the wedging action.

The outer casing 32 which acts as a bridging member connecting the collars is then positioned over the collars 24 and the retaining nuts 23 screwed into the casing and tightened to a predetermined torque. The end caps 22 are screwed onto the projecting portions of the nuts and an outer heat shrink boot 21 is applied to complete the joint.

The hollow tubular part 26 is able to resist the longitudinal compressive force e.g. 35 kN exerted on it when the collars 24 are pressed towards each other to clamp the wires in the preloading operation mentioned earlier as well as about 70 kN compression force exerted at a sea depth of say 7 km. The bridging member in the form of the outer casing 32 is able to withstand the full tensile load applied to the cable (e.g. 50 kN).

The diameter of the joint is about 30 mm and the length about 120 mm which is highly compact in relation to the cable diameter which is about 13 mm.

There has been described a joint for an optical cable having a tapered hollow insert with high friction surfaces so that after jointing the optical package, the cable strength members can be clamped onto the high friction surfaces of the insert by a wedging action. The surfaces prevent the strength members moving axially and imposing longitudinal strain on the jointed package. Creating a differential strain in the cable.

Also the wires of the inner layer 6A have a larger diameter (1 mm) than the wires of the outer layer 6B which have a diameter of about 0.7 mm. We have found that the smaller wires can be adequately clamped between the mild steel wedges 25 and the mild steel clamping collars 24 and that when preloading takes place the two wire layers do not suffer differential strain. The outer wires are pulled taught but this is insignificant.

We claim:

1. A joint for jointing opposed ends of an optical fibre underwater cable having a central fibre optic transmission element and having a tensile strength layer of circular cross-section and surrounding the transmission element, the joint comprising a tubular member having a bore for accommodating the joined transmission elements of the opposed cable ends and having an outer taper at each end, said outer tapers each having a high friction surface, first and second collars each having a tapered bore which matches a respective outer taper of the tubular member, and a water-tight housing structure, wherein the first and second collars can be urged together whereby to clamp opposed end portions of the strength layer against the respective outer tapers of the tubular member, there being means associated with the housing structure for retaining the first and second collars in their clamping position.

2. A joint as claimed in claim 1, wherein each said outer taper of the tubular member has a nose cone which is softer than the tubular member.

3. A joint as claimed in claim 1, wherein the optical fibre is housed in a tubular conductor of the cable, the joint comprising; a conductive tube for location between opposed ends of said tubular conductor; and thin conductive ferrules which fit partly over the conductor and partly over the adjacent end of the tube and solderable to both to reinstate the tubular conductor within the joint.

4. A joint according to claim 1, wherein said retaining means comprises a bridging member having at each end an internal thread, and a pair of externally threaded nuts which screw into the bridging member to engage and retain the collars.

5. A joint for jointing opposed ends of an optical fibre underwater cable having an outer fibre optic transmission element and having first and second tensile strength layers of circular cross-section and surrounding the transmission element, the joint comprising a tubular member having a core for accommodating the joined transmission elements of the opposed cable ends and having an outer taper at each end, said outer tapers each having a high friction surface, first and second tapered inserts corresponding in shape to the outer taper of said tubular member and each adapted to fit between the first and second strength layers of the corresponding cable end, first and second collars each having a tapered bore which matches a respective outer taper of the tubular member, and a water-tight housing structure, wherein the first and second collars can be urged together whereby to clamp opposed end portions of each said second strength layer between the respective collar and tapered insert and whereby to clamp opposed end portions of each said first strength layer between the respective tapered insert and outer taper of the tubular member, there being means associated with the housing for retaining the first and second collars in their claiming position.

6. A joint as claimed in claim 5, wherein each said outer taper has a roughed surface on to which the first layer is clamped, and wherein the tapered inserts and the collars one of softer metal than that of the tubular member.

7. A joint as claimed in claim 6, wherein the roughened surface comprises a hard grit bonded to the surfaces of the outer tapers.

8. A joint as claimed in claim 5, wherein the tubular member has a soft metal nose cone on each end.

* * * * *